(12) United States Patent
Bucsa et al.

(10) Patent No.: US 10,366,591 B2
(45) Date of Patent: Jul. 30, 2019

(54) SAFETY COOKING DEVICE AND METHOD

(71) Applicant: Tyco Safety Products Canada Ltd., Concord (CA)

(72) Inventors: Andrei Bucsa, Concord (CA); Gregory W. Hill, Newmarket (CA); Rob Vandervecht, Acton (CA)

(73) Assignee: TYCO SAFETY PRODUCTS CANADA LTD., Concord (CA)

( * ) Notice: Subject to any disclaimer, the term of this patent is extended or adjusted under 35 U.S.C. 154(b) by 0 days.

(21) Appl. No.: 15/912,966

(22) Filed: Mar. 6, 2018

(65) Prior Publication Data

US 2018/0253953 A1 Sep. 6, 2018

Related U.S. Application Data

(60) Provisional application No. 62/467,313, filed on Mar. 6, 2017.

(51) Int. Cl.
*G08B 17/06* (2006.01)
*G08B 17/12* (2006.01)
(Continued)

(52) U.S. Cl.
CPC ............. *G08B 17/12* (2013.01); *F23N 5/242* (2013.01); *F24C 3/12* (2013.01); *F24C 7/08* (2013.01);
(Continued)

(58) Field of Classification Search
CPC .................. H05B 3/746; H05B 2213/04; H05B 2213/07; H05B 6/062; H05B 6/12; H05B 3/22; H05B 3/76; A47J 27/002; A47J 36/02; A47J 36/36; A47J 39/00; A47J 41/0077; A47J 41/02; A47J 27/62; H01F 41/00; Y10T 29/4902; Y10T 307/461; Y10T 307/477; A62C 3/006; F24C 3/12; F24C 3/122; F24C 3/126; F24C 7/08; F24C 7/083; F24C 7/087; F24C 7/088; G01J 2005/0074; G01J 2005/0051; G01J 2005/0081; G08B 17/12; F23D 2208/10;
(Continued)

(56) References Cited

U.S. PATENT DOCUMENTS 6,285,012 B1 * 9/2001 Connolly ............... H05B 3/746
219/448.11
9,811,818 B1 * 11/2017 Xing .................. A61B 10/0051
(Continued)

OTHER PUBLICATIONS

International Search Report and Written Opinion of the International Searching Authority, dated May 7, 2018, from International Application No. PCT/IB2018/051449, filed on Mar. 6, 2018. 9 pages.
(Continued)

*Primary Examiner* — Daniel Previl
(74) *Attorney, Agent, or Firm* — Arent Fox LLP

(57) ABSTRACT

A Safety Cooking Device includes a thermal sensor that detects infrared radiation (IR) to generate thermal images of a cooktop over time, and a controller. The controller uses the thermal images to determine whether the cooktop is unattended. Both wired and wireless embodiments of the cooking safety device are disclosed. In one implementation, the cooking safety device is in communication with and reports to a security panel of a security system.

21 Claims, 10 Drawing Sheets

(51) Int. Cl.
| | |
|---|---|
| F24C 7/08 | (2006.01) |
| F24C 3/12 | (2006.01) |
| H05B 6/06 | (2006.01) |
| F23N 5/24 | (2006.01) |
| G01J 5/08 | (2006.01) |
| G01J 5/02 | (2006.01) |
| G08B 21/12 | (2006.01) |
| G08B 21/14 | (2006.01) |
| G08B 25/10 | (2006.01) |
| G01J 5/00 | (2006.01) |

(52) U.S. Cl.
CPC ............... *G01J 5/025* (2013.01); *G01J 5/026* (2013.01); *G01J 5/0275* (2013.01); *G01J 5/089* (2013.01); *G01J 5/0896* (2013.01); *G08B 21/12* (2013.01); *G08B 21/14* (2013.01); *G08B 25/10* (2013.01); *H05B 6/062* (2013.01); *F23D 2208/10* (2013.01); *G01J 2005/0048* (2013.01); *G01J 2005/0051* (2013.01); *G01J 2005/0074* (2013.01); *G01J 2005/0077* (2013.01); *G01J 2005/0081* (2013.01); *H05B 2213/07* (2013.01)

(58) Field of Classification Search
CPC .......... G05F 1/452; H02M 2005/2937; H02M 5/2576
USPC .......... 340/287, 589, 540, 584, 588, 870.16, 340/286.05, 289, 293, 815.45, 870.17
See application file for complete search history.

(56) References Cited

U.S. PATENT DOCUMENTS

| | | | |
|---|---|---|---|
| 2005/0265423 A1 | 12/2005 | Mahowald et al. | |
| 2011/0134413 A1* | 6/2011 | Has | F24C 7/082 356/51 |
| 2013/0187781 A1* | 7/2013 | Bach | F24C 15/2021 340/584 |
| 2014/0379588 A1* | 12/2014 | Gates | G06Q 10/0631 705/308 |
| 2018/0089534 A1* | 3/2018 | Ye | G06F 17/30256 |

OTHER PUBLICATIONS

Panasonic Infrared Array Sensor Grid-EYE (AMG88) (2016).
"AKM Releases an Infrared Sensor with Optical Filter; the AK9710 is Suitable for NDIR CO2 Sensing" News Release dated Jan. 20, 2017.
"MLX906021 16×4 IR Array Datasheet" Melexis Inspired Engineering, 1-44 (2016).
"How to Measure the Size of a Laser Dot?" https://physics.stackexchange.com/questions/160705/how-to-measure-the-size-of-a-laser-dot (2015).

\* cited by examiner

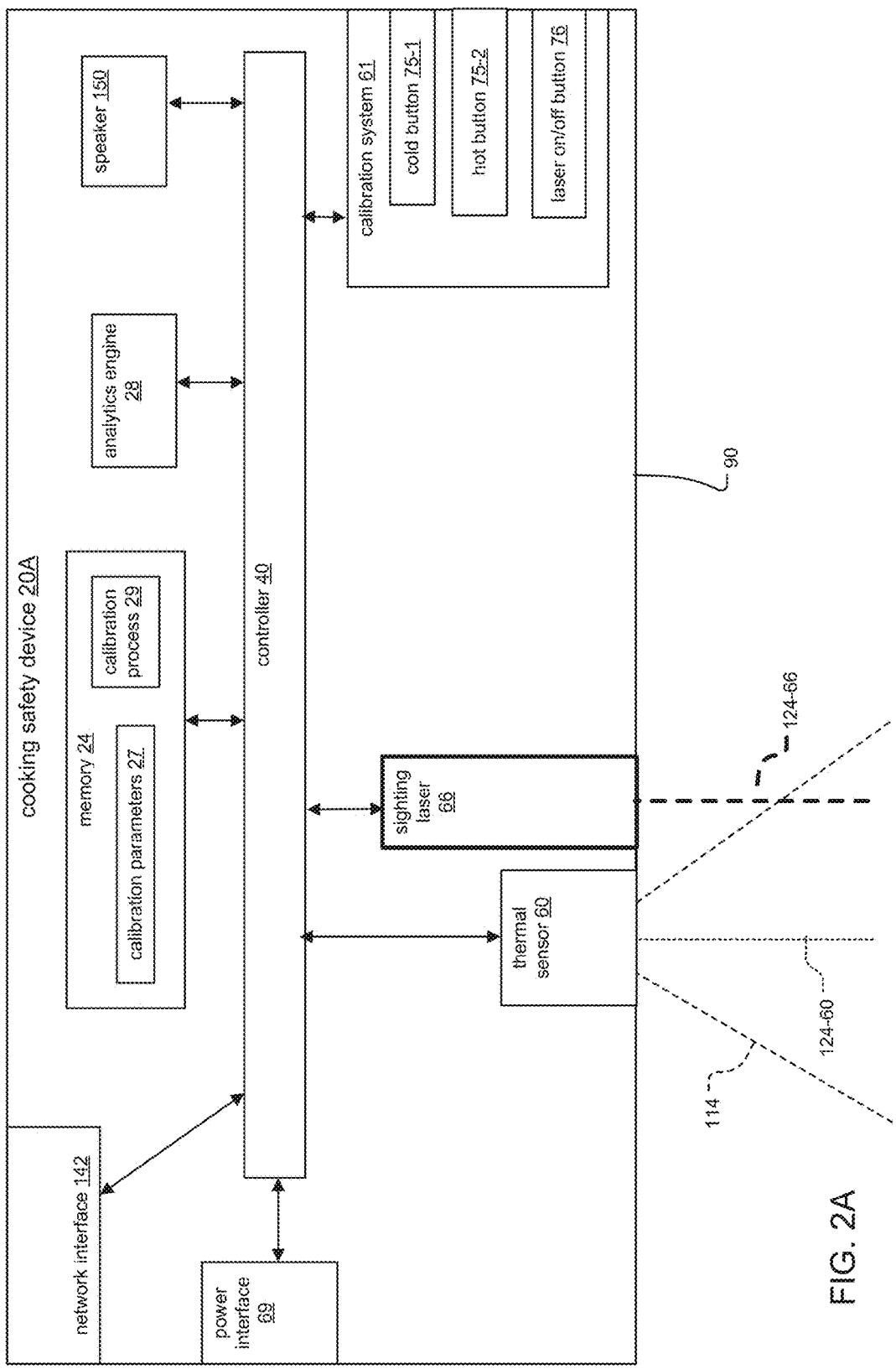

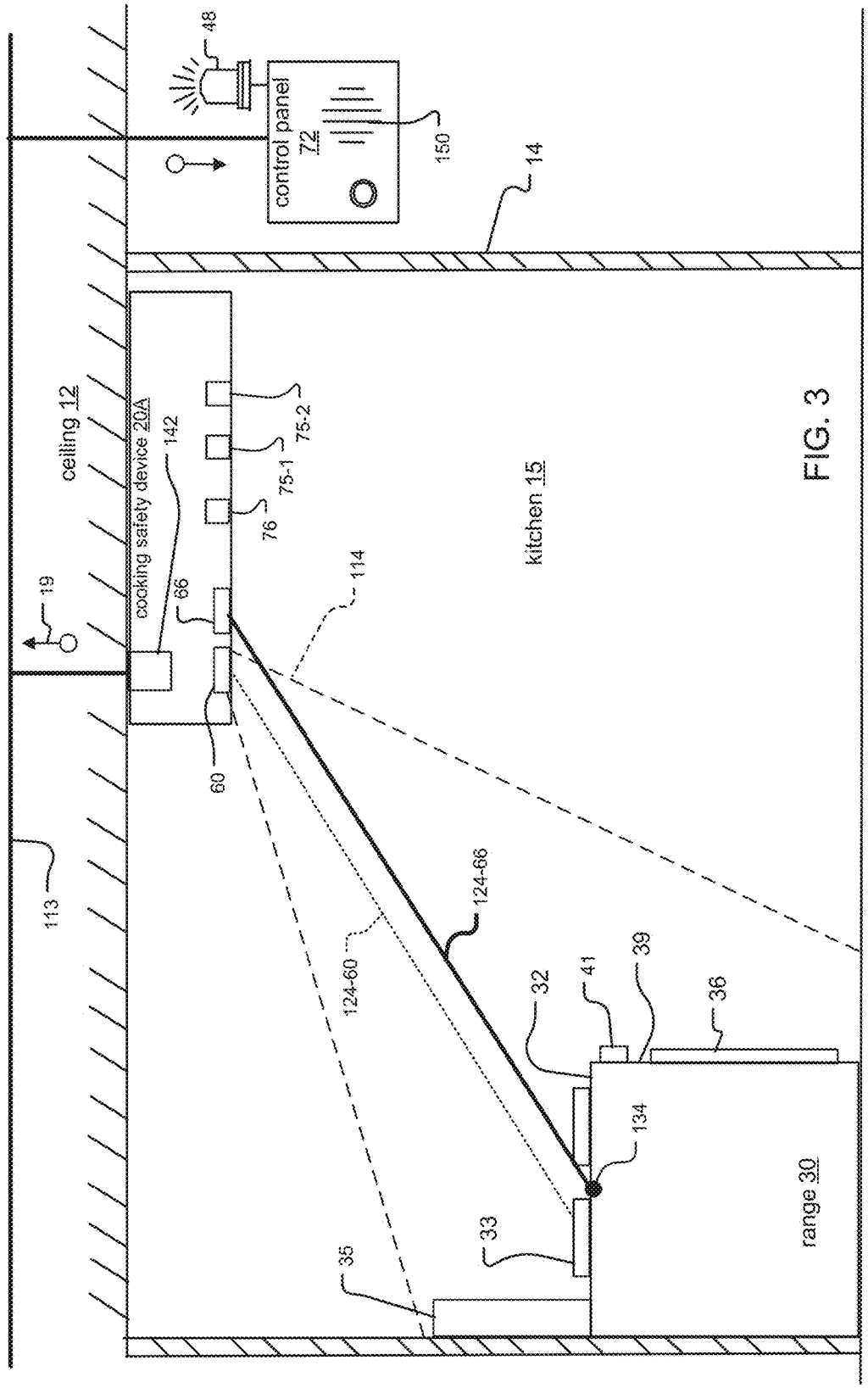

SAFETY COOKING DEVICE AND METHOD

RELATED APPLICATIONS

This application claims the benefit under 35 USC 119(e) of U.S. Provisional Application No. 62/467,313 filed on Mar. 6, 2017, which is incorporated herein by reference in its entirety.

BACKGROUND OF THE INVENTION

Security systems are often installed within a premises such as commercial, residential, or governmental building. Examples of these buildings include offices, hospitals, warehouses, multi-unit dwellings, schools or universities, shopping malls, government offices, and casinos. These systems generally include security panels that function as system controllers and distributed devices.

Kitchens are among the most frequent locations of fire origin within residences and commercial buildings. Kitchen fires are usually the result of cooking accidents involving cooking appliances. Cooking appliances include cooktops, ranges/stoves, toasters, toaster ovens, and microwave ovens.

These cooktops include one or more heating elements that are controlled by an individual for heating and/or cooking of food. An individual controls the level of energy applied to the heating elements using control knobs, for example, of the cooktops. Examples of heating elements include radiant heating elements such as electrically heated coils, inductive heating elements, and natural gas fired heating elements.

The cooktops are either part ranges or are standalone devices. The ranges include cooktops and ovens, and may help save kitchen space. The standalone cooktops are typically installed in or placed upon a countertop.

The cooktops especially require supervision by individuals. In one example, this is due to the open nature of cooking with cooktops, where grease and/or food can ignite. Moreover, cooktops do not have a built-in control mechanism to shut off the source of energy applied to the heating elements after a preset time period, as in other cooking appliances.

Unfortunately, instances of unattended/unsupervised cooking using cooktops does occur for various reasons. In one example, individuals may simply become distracted and forget that the cooktop is on. In other examples, the individual might not be able to turn off a cooktop due to the individual experiencing a medical issue such as a heart attack or stroke, or otherwise not be able to respond to a cooktop fire fast enough due to limited capacity. These latter reasons are especially a concern among individuals aged 65 years or older. According to an ongoing study of the US Federal Emergency Management Agency (FEMA), people over age of 65 have 2.5 times greater risk of dying in a kitchen fire than the general population, often due to unattended cooking using cooktops.

Current approaches for monitoring whether or not a cooktop is supervised typically involve capabilities integrated within the cooktop itself. The approaches generally require the addition of multiple sensors that detect when the cooktop is turned on, and then monitor other factors over time. In examples, these approaches require the addition of sensors to monitor energy consumption, gas flow, or to supervise positions of knobs that supply energy to the heating elements, along with activity detection (whether people are present and/or moving within the kitchen).

SUMMARY OF THE INVENTION

The present invention can be implemented as a low-power and low-cost cooking safety device that can be external to the cooktops. The proposed cooking safety device can be utilized to monitor and detect instances of possibly unattended/unsupervised cooking at any cooktop, without requiring modifications to the cooktop.

In response to determining instances of unattended/unsupervised cooking, the device might alert individuals in response via a speaker or other sound source, and can send alarm messages over a security network to a security panel. Both wired and wireless embodiments of the cooking safety device are disclosed.

The proposed cooking safety device can be mounted on a ceiling of the kitchen or an opposed wall from where the cooktop is located. The device is also mounted such that a thermal sensor of the device captures images from a front of the cooktop. And these images might be obstructed by individuals operating the cooktop.

The thermal sensor is a non-contact device that detects heat in the form of infrared (IR) energy. The thermal sensor converts the detected IR energy into an electronic signal, and then processes the signal to produce a thermal image. In one example, the thermal sensor is a spatially-resolved sensor that includes rows and columns of pixels that are responsive to IR energy. In this way, the sensor generates an image of the cooktop.

The thermal image of an object is an image representation of infrared (IR) energy emitted from that object. The higher the object's temperature, the greater the IR radiation emitted. Usually, hotter areas or "hotspots" within the thermal image typically appear very bright, while cooler areas that emit lesser amounts of IR energy appear darker in the image.

In general, according to one aspect, the invention features a cooking safety device. It comprises a thermal sensor that detects infrared radiation (IR) to generate thermal images of a cooktop over time and a controller that uses the thermal images to determine whether the cooktop is unattended.

An analytics engine can be used that analyzes the thermal images captured by the thermal sensor to determine whether one or more heating elements of the cooktop are on. This system might also analyze the thermal images captured by the thermal sensor to determine whether an uncontrolled fire exists.

Preferably, the thermal sensor is a spatially resolved detector having pixels arranged in an array. Further, a trigger sensor can be used that detects heat, flames, or motion at the cooktop, and sends a signal to turn on the thermal sensor in response to the detection. This can be used to reduce power consumption.

For installation, a sighting laser for positioning the field of view of the thermal sensor can be used. This sighting laser can be part of the device or used only for the installation process.

In typical operation, the device sends an alarm signal to a panel in response to determining that the one or more heating elements of the cooktop are on and that the cooktop is unattended, for a predetermined time period. The analytics engine can determine whether the one or more heating elements of the cooktop are on by comparing a new thermal image of the cooktop against a baseline cold thermal image of the cooktop and/or a baseline hot thermal image of the cooktop.

In the illustrated example, a field of view of the thermal sensor is positioned such that individuals located near a front of the cooktop mask the heating elements from a view of the thermal sensor.

In general, according to another aspect, the invention features a method for monitoring a cooktop. The method comprises detecting infrared radiation (IR) to generate thermal images of the cooktop over time and using the thermal images to determine whether the cooktop is unattended.

In general, according to another aspect, the invention features a cooking safety device. This device comprises a thermal sensor that detects infrared radiation (IR) to generate thermal images of a cooktop over time and a trigger sensor that detects heat, flames, or motion at the cooktop, and sends a signal to turn on the thermal sensor in response to the detection.

In general, according to still another aspect, the invention features a cooking safety device. It comprises a thermal sensor that detects infrared radiation (IR) to generate thermal images of a cooktop over time and a sighting system for positioning the field of view of the thermal sensor with respect to the cooktop.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 2A is a block diagram showing more detail for the cooking safety device of FIG. 1A;

FIG. 3 is a schematic diagram that illustrates typical installation of an exemplary cooking safety device relative to a cooktop, and also illustrates calibration of the device;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
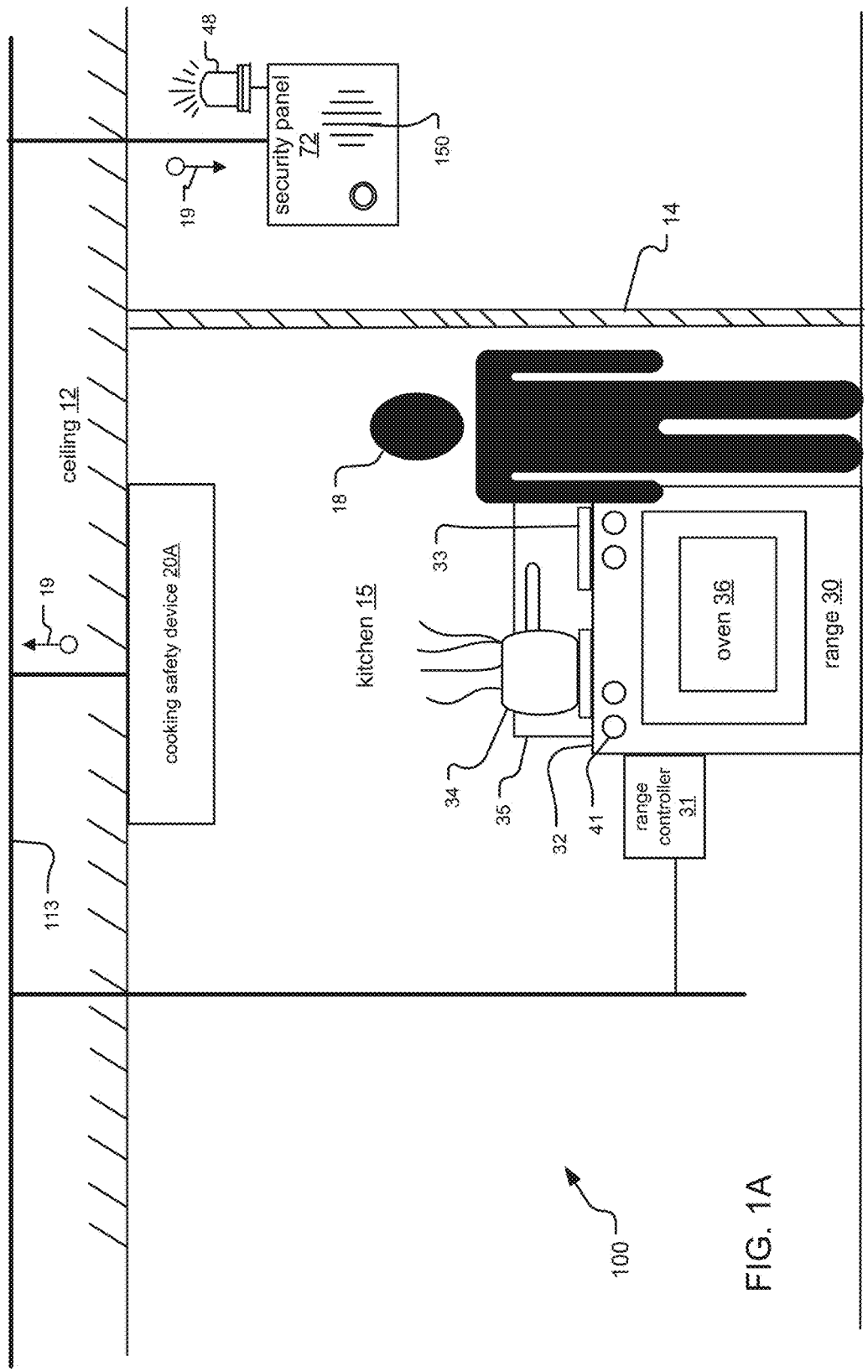
FIG. 1A is a schematic diagram showing the deployment of an exemplary cooking safety device constructed in accordance with principles of the present invention, where the device is installed within one or more rooms of the premises such as within a kitchen, and where the device leverages existing building wiring for communications and input power.

FIG. 1A is a schematic diagram showing an embodiment of an exemplary cooking safety device 20A installed in a premises. The cooking safety device 20A is installed within the same room as a cooking appliance such as a range 30 is located, such as within a kitchen 15.

The range 30 includes a cooktop 32, an oven 36, and a range controller 31, in one implementation. The cooktop 32 includes heating elements 33 that are controlled by control knobs 41. A pot 34 is shown placed upon one of the heating elements 33, and water within the pot 34 is boiling.

In the illustrated example, the cooking safety device 20A is a component of a security/life-safety system 100 at the premises. The cooking safety device 20A communicates with a security network 113 of the security system 100 via a wired connection (e.g. Ethernet/twisted pair) and reports to a security panel 72. The cooking safety device 20A receives a source of input power from existing power wiring within the premises, such as from power wiring of the security panel 72. The range controller 31 also communicates with the cooking safety device 20A and the security panel 72 over the security network 113. In another implementation, the cooking safety device 20A might also be a stand-alone component that is not in communications with a security system 100.

In more detail, the cooking safety device 20A has a thermal sensor that detects infrared radiation (IR) to generate thermal images of cooking appliances such as the cooktop 32 over time. The cooking safety device 20A also has a controller that uses the thermal images to determine whether the cooktop 32 is unattended.

The thermal sensor is a spatially resolved detector. Under current technology, such devices typically have a relatively low pixel count, on the order of tens or hundreds of pixels. The pixels are arranged in two-dimensional arrays of pixels such as 8×8, 16×16, and 4×16 arrays. This relatively low resolution sensor can be sufficient for purposes of the present system, while also being very low in cost. In a current implementation, the thermal sensor is an infrared array sensor sold by Panasonic Corporation under the name "Grid-EYE". The temperature detection of a two-dimensional area uses 8×8 (64 pixels). Another option is an MLX90621 by Melexis N.V.

Each thermal image provides a "heat signature" of the cooktop 32 at the time in which the thermal image was captured. Thermal images of a hot cooktop 32 will be much brighter than thermal images of a cold cooktop 32, for example. The cooking safety device 20A can then analyze the thermal images over time to determine if the cooktop 32 is on or off, supervised or unsupervised, and whether an unusual situation such as a fire is occurring, in examples.

Also in the illustrated example, the cooking safety device 20A is installed onto a ceiling 12 of the kitchen 15 or upon a wall 14 that is adjacent or opposite to the cooktop 32.

Preferably, the cooking safety device 2A is installed such that an optical axis of the thermal sensor is pointed at the cooktop 32, the cooktop 32 is included within a field of view of the thermal sensor. Further, individuals 18 standing near a front of the cooktop 32 will additionally block one or more of the heating elements 33 from the view of the thermal sensor. In this way, when an individual 18 steps in front of a hot cooktop 32, for example, the individual 18 blocks much of the IR emitted by the heating elements 33 from being detected by the thermal sensor. The cooking safety device 20 can then determine whether the cooktop is attended based on changes in these thermal images over time.

In one example, the cooking safety device 20A can compare brightness in thermal images captured over time to determine whether the cooktop 32 is unattended. For example, a previously captured thermal image of a hot cooktop 32 that is not blocked by an individual 18 will be brighter than a new thermal image obtained when an individual 18 is blocking heating elements 33 of the cooktop 32 from "view" of the thermal sensor.

In another example, the cooking safety device 20A can utilize a fast temperature transition between pixels unblocked/unmasked and then blocked/masked by the body of an individual 18 in the thermal images captured over time to determine whether the cooktop 32 is unattended. This is because the temperature transition of the cooktop 32 itself varies much more slowly over time, as compared to the temperature transition between pixels unmasked and then masked by the body of an individual 18.

The cooking safety device 20A can take various actions in response to determining that a fire is occurring at the cooktop, and/or that the cooktop is both on and unattended for a time period. In one example, the cooking safety device 20A activates a speaker of the device 20A to warn occupants. In another example, the cooking safety device 20A sends an alarm signal 19 to the security panel 72. In response, the security panel 72 can activate its speaker 150, turn on an alarm notification device such as strobe 48, and contact first responders. In yet another example, the device 20A might also send a control signal to the range controller 31 of a "smart" range 30 to power down its cooktop 32. The cooking safety device 20A can also include other sensors that correlate data in case of possible fire when the detected temperature exceeds a maximum threshold for a period of time ($CO_2$, smoke, etc).

Figure 1B:
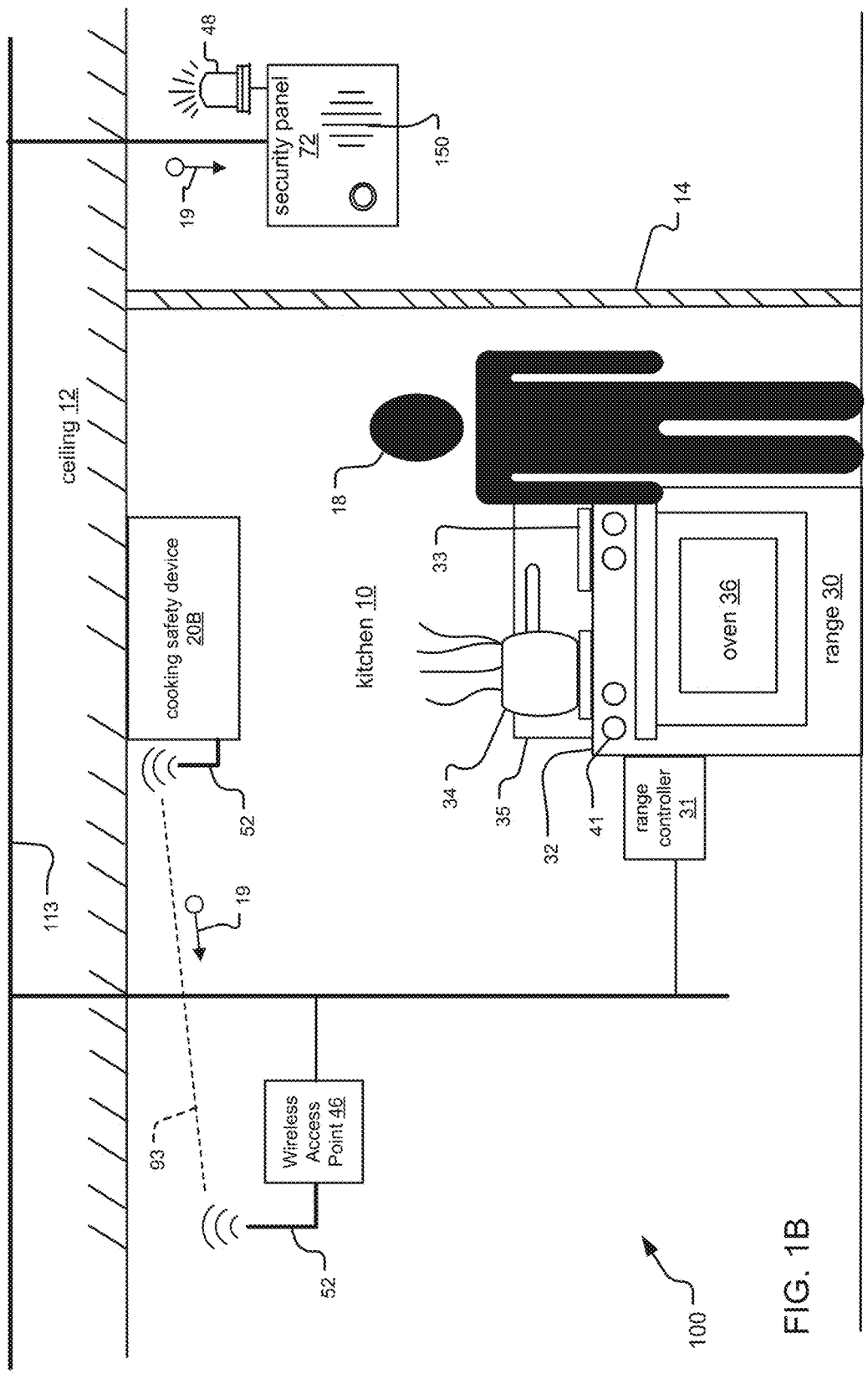
FIG. 1B is a schematic diagram showing another deployment of the exemplary cooking safety device constructed in accordance with principles of the present invention, where the cooking safety device communicates wirelessly and is powered by a battery.

FIG. 1B is a schematic diagram showing a wireless embodiment of an exemplary cooking safety device 20B installed in a premises.

The wireless cooking safety device 20B communicates with a wireless access point 46 of the security system 100. The cooking safety device 20B and the wireless access point 46 both have antennas 52 for transmitting and receiving information wirelessly. The wireless access point 46 provides a wireless communications channel 93 to the cooking safety device 20B. The cooking safety device 20B sends and receives information over the channel 93, such as sending alarm signals 19 to the security panel 72 via the wireless channel 93.

The cooking safety device 20B otherwise operates in a substantially similar manner and has similar components as the cooking safety device 20A of FIG. 1A.

FIG. 2A is a block diagram showing more detail for the cooking safety device 20A of FIG. 1A.

Various components of the cooking safety device 20A are shown. The components include a controller 40, a power interface 69, a network interface 142, memory 24, an analytics engine 28, a speaker 150, a calibration system 61, a thermal sensor 60, and a sighting laser 66. The memory 24 stores calibration parameters 27 and a calibration process 29 used by the calibration system 61.

Here, components that "touch" outside edges of a body 90 of the cooking safety device 20A have a special meaning. These components either enable interaction between individuals and the cooking safety device 20A, or otherwise provide an interface between the cooking safety device 20A and external devices. These components include the thermal sensor 60, the sighting laser 66, the network interface 142, and the calibration system 61.

The calibration system 61 includes buttons that enable individuals to interact with and calibrate the cooking safety device 20A during installation. The buttons include a cold button 75-1 for creating a baseline cold thermal image of the cooktop 32, a hot button 75-2 for creating a baseline hot thermal image of the cooktop 32, and a laser on/off button 76 for controlling the sighting laser 66.

During calibration, the controller 40 accesses the calibration process 29 from memory 24. The controller then executes the instructions of the calibration process 29 on behalf of the calibration system 61.

A field of view 114 of the thermal sensor 60 is also shown. The field of view 114 is centered about an optical axis 124-60 of the thermal sensor 60. The sighting laser 66 emits a beam of light along an optical axis 124-66. The optical axes 124-60 and 124-66 of the thermal sensor 60 and sighting laser 66, respectively, are substantially parallel to one another. The optical axis 124-66 of the sighting laser 66 is also within the field of view 114 of the thermal sensor 60.

Figure 2B:
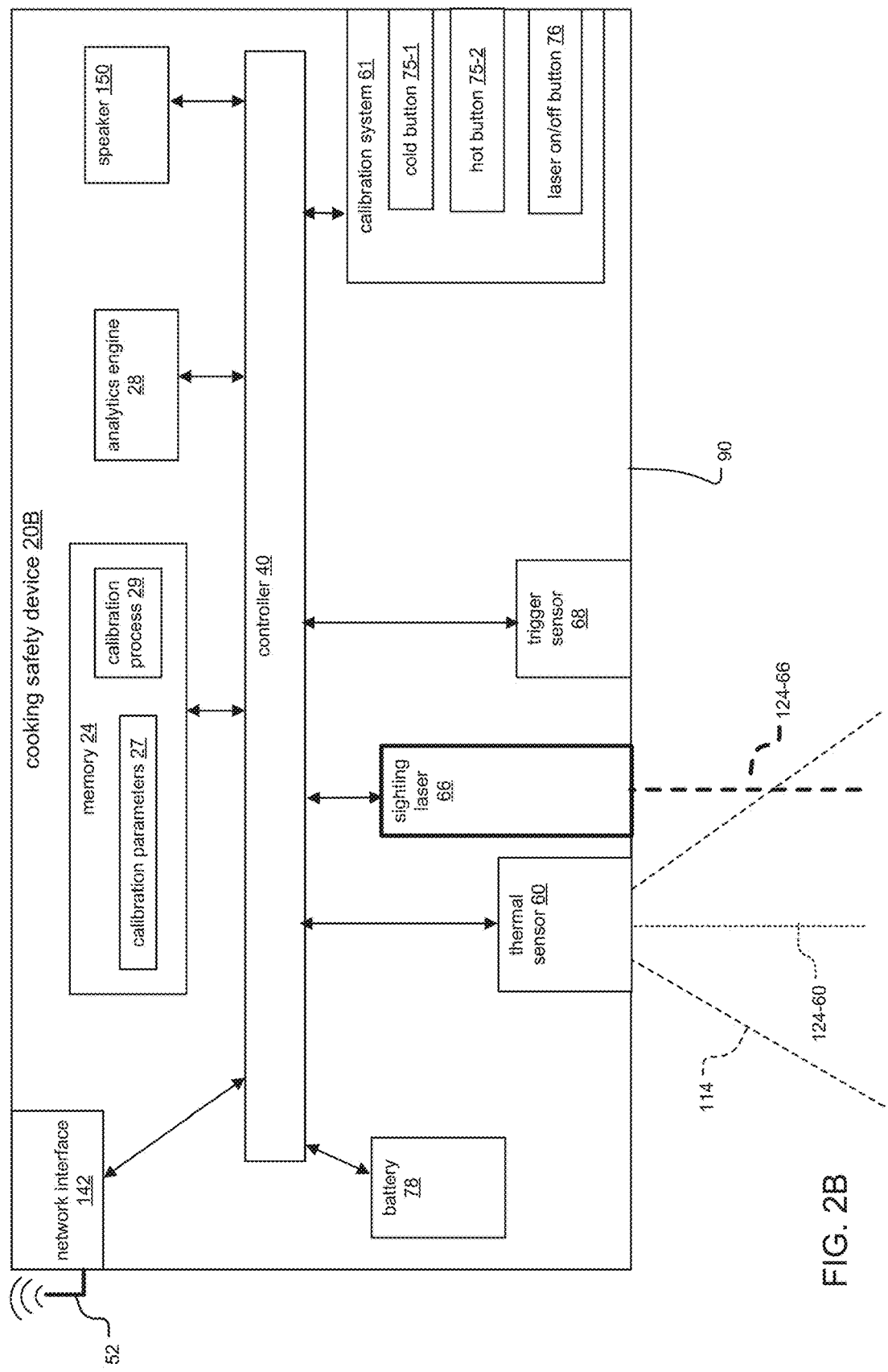
FIG. 2B is a block diagram showing more detail for the cooking safety device of FIG. 1B.

FIG. 2B shows more detail for the cooking safety device 20B of FIG. 1B. The cooking safety device 20B is both wireless and battery powered.

The cooking safety device 20B includes all components as the cooking safety device 20A of FIG. 2A, with the exception of the power interface. Instead, cooking safety device 20B is powered by an internal battery 78 or supercapacitor, in examples.

In the illustrated example, the network interface 142 of cooking safety device 20B is a wireless interface. An antenna 52 such as a WiFi antenna is connected to network interface 142.

The cooking safety device 20B additionally includes a trigger sensor 68. The trigger sensor 68 is a device that consumes very low power (much less than the thermal sensor). In examples, the trigger sensor is a motion detector that detects motion near the cooktop 32, a flame sensor that detects a fire/flames at the cooktop 32, or a heat sensor such as a thermocouple that detects heat at the cooktop 32, in examples.

In one example, the flame sensor typically detects fire by detecting radiation of a wavelength that corresponds to a hydrocarbon fire that generates CO2. In one example, the flame sensor is an IR quantum receiver that is sensitive to radiation of about 4.28 micrometers (um) in wavelength. One option is the AK9710 sold by Asahi Kasei Microdevices Corporation.

The cooking safety device 20B uses the trigger sensor 68 in conjunction with the thermal sensor 60 to conserve power during operation. Here, the thermal sensor is normally in an offline or "sleep" mode until awoken by the trigger sensor 68. After the trigger sensor detects motion, flame, or heat, the trigger sensor 68 sends a signal to activate the thermal sensor 60 to begin capturing of thermal images.

FIG. 3 illustrates typical installation of an exemplary cooking safety device 20A relative to a cooktop, and also illustrates calibration of the device.

During installation, an individual positions the cooking safety device 20A on a wall 14 or ceiling 12 near the cooktop 32. Then, to calibrate the cooking safety device 20A, the individual selects the laser on/off button, and observes the beam of light emitted from the sighting laser 66. The individual then adjusts the position of the cooking safety device 20A such that a point or other geometric pattern 134 of the beam impinges upon a medial line of the cooktop 32/range 30 that runs from a front 39 of the cooktop 32 to a back 35 of the cooktop 32. Preferably, the point 134 should also be centrally located on the cooktop 32 relative to the heating elements 33. The geometric pattern can also be used to determine the range to the cooktop.

The shape of the point 134 is typically elliptical in nature. The ellipticity of the dot/point 134 represents the angle at which the beam impinges upon the cooktop 32. The individual then adjusts the position of the cooking safety device 20A until the laser projected ellipse dimension is within recommended range, and to set back those parameters to the sensor 20A. These parameters are saved as calibration parameters and are used to estimate the measuring distance.

In this way, the distance between the thermal sensor 60 and the cooktop 32 can be estimated and a temperature reading compensation can be performed. Also, this measurement might indicate that the thermal sensor 60 is placed too close or too far (based on the field of view 114 of the thermal sensor 60).

The overall size of the point 134 of the sighting laser 66 can also determine the range between the thermal sensor 60 and the cooktop 32. For this purpose, a lens in front of the thermal sensor 60 with a known focal length can be utilized. Based on the size of the point 134 and the lens' focal length, the distance from the thermal sensor 60 to the cooktop 32 can be calculated. Here, the IR attenuation is related to the distance to the object (based on the fact that the cooktop 32 temperature can be estimated). The manufacturer of the thermal sensor 60 will typically provide the distance range for an effective measurement for a specific module.

Because the optical axes 124-60 and 124-66 of the thermal sensor 60 and sighting laser 66 are substantially parallel to one another and are separated by a very short distance, the calibration of the sighting laser 66 also operates to define the field of view 114 of the thermal sensor.

The act of selecting the laser on/off button 76 to begin its calibration also enrolls the cooking safety device 20A with the security panel 72. During enrollment, the width and height of the cooktop 32 are determined by the cooking safety device 20A and are sent to the security panel 72 over the security network 113.

Once the laser projected ellipse dimension of the point 134 is within recommended size range, the individual fastens the cooking safety device 20A to the ceiling 12 or wall 14.

The individual then continues the calibration of the thermal sensor 60 by obtaining a baseline cold thermal image and a baseline hot thermal image. For this purpose, the individual verifies that the cooktop is cold, and selects the cold button 75-1 on the cooking safety device 20A. The thermal sensor 60 captures the baseline cold thermal image, and the controller 40 stores it to the calibration parameters 27 within memory 24. To obtain the baseline hot thermal image, the individual typically turns the control knobs 41 of the cooktop 32 to their highest setting, which correspondingly provides maximum energy to the heating elements 33. The individual then selects the hot button 75-2 on the cooking safety device 20A. The captured baseline hot thermal image is also stored to the calibration parameters 27 by the controller 40.

In this way, when an individual 18 steps in front of an unattended and hot cooktop 32, for example, the individual 18 blocks much of the IR energy emitted by the heating elements 33 from being detected by the thermal sensor. As a result, the thermal image obtained is much less brighter. The controller 40 of the cooking safety device 20 can then determine whether the cooktop 32 is unattended, based on changes in the thermal images over time.

Figure 4A:
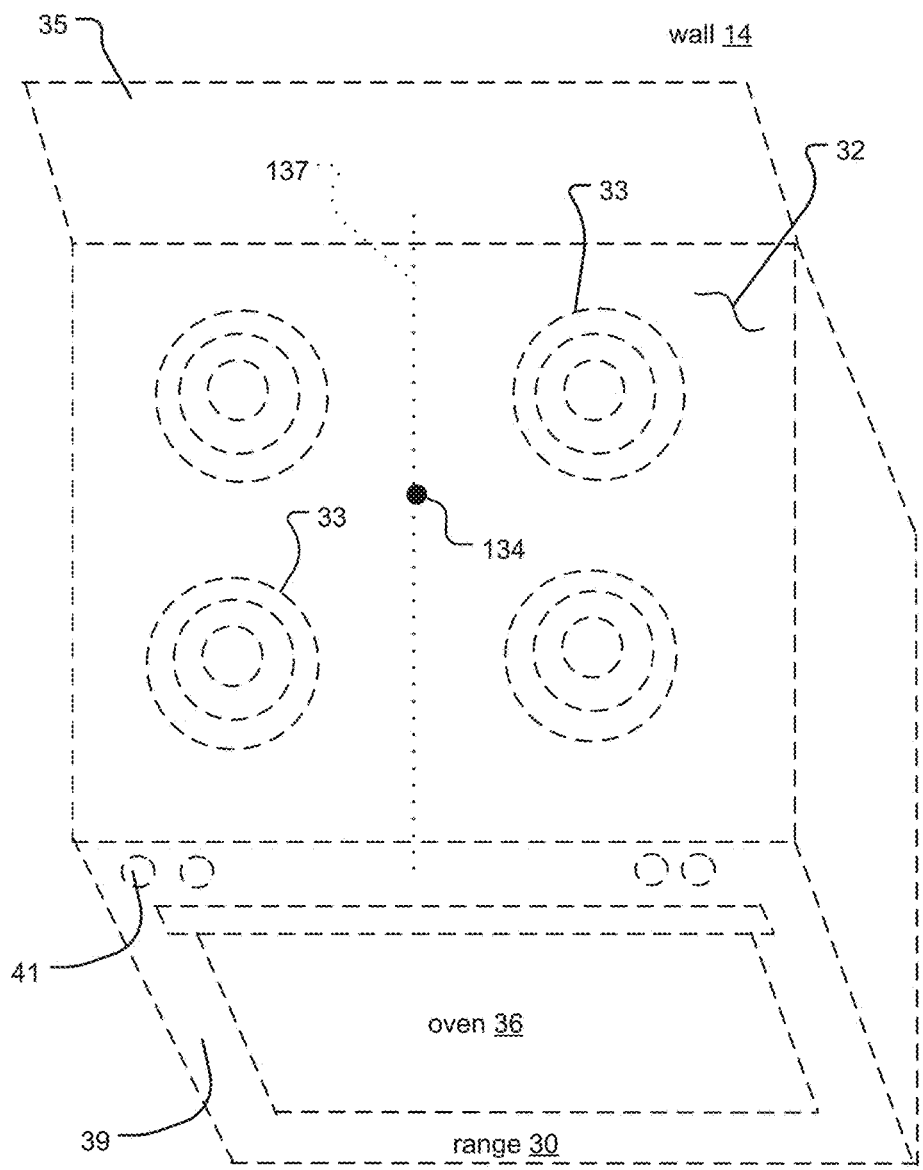
FIG. 4A is a diagram that represents a viewpoint of a thermal sensor of the cooking safety device, showing what the thermal sensor might "see" when the cooking safety device is properly installed and calibrated, and the cooktop is cold.

FIG. 4A is a diagram that represents a viewpoint of the thermal sensor 60. The figure shows what the thermal sensor 60 of the cooking safety device 20A might "see" when the cooking safety device 20A is properly installed and calibrated, and the cooktop 32 is cold.

Here, the entirety of the cooktop 32 and range 30 is represented as dashed lines to indicate that the cooktop 32/range 30 are relatively invisible to the thermal sensor 60. This is because the stove/stovetop is cold, and the level of IR emitted from the stove/stovetop is consistent with room ambient temperature/blackbody radiation.

Figure 4B:
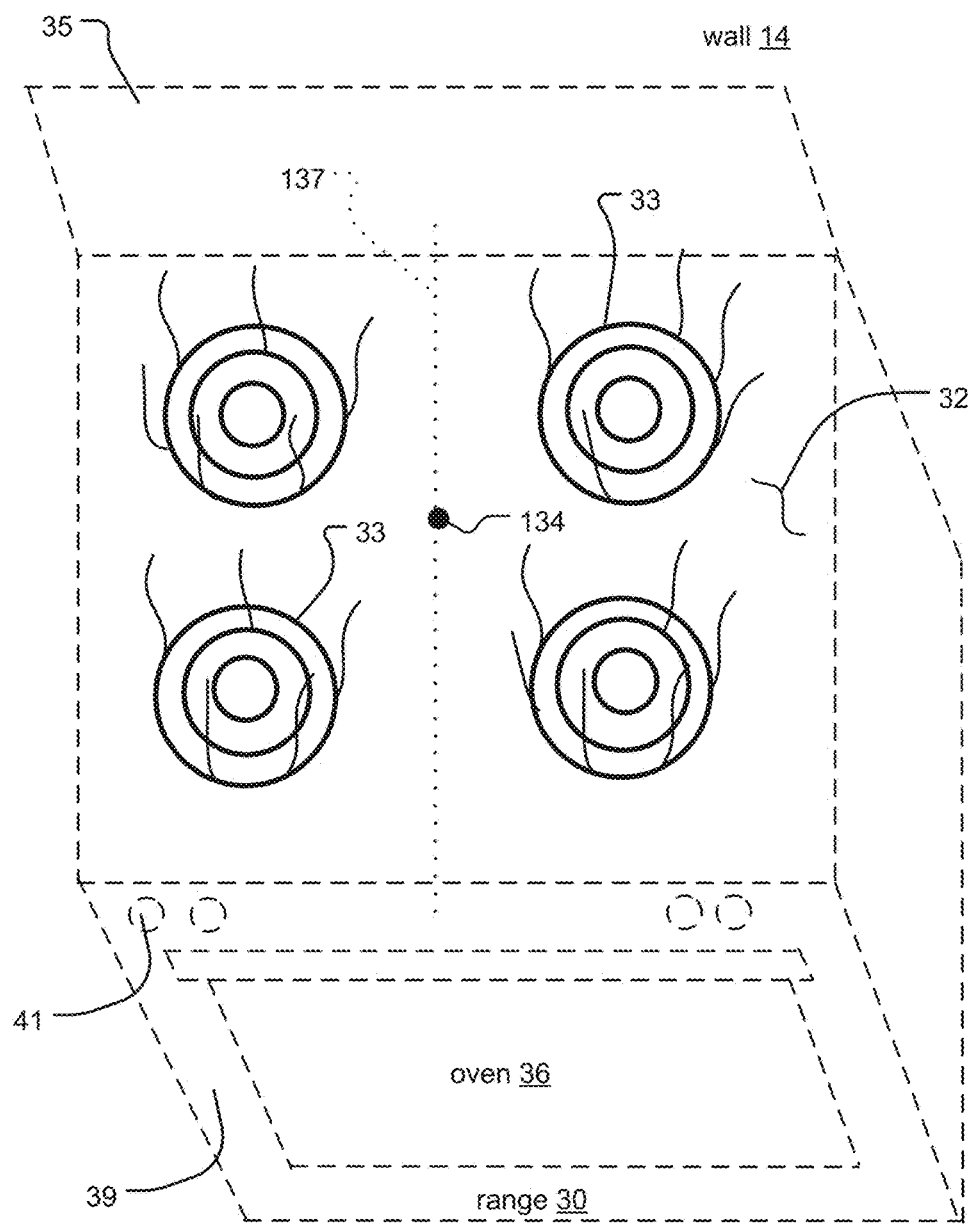
FIG. 4B is a diagram that represents a viewpoint of the thermal sensor as in FIG. 4A, but instead the cooktop is hot.

FIG. 4B is a diagram that represents another viewpoint of the thermal sensor 60. The figure shows what the thermal sensor 60 of the cooking safety device 20A might "see" when the cooking safety device 20A is properly installed and calibrated and the cooktop 32 is hot.

Here, the heating elements 33 of the cooktop 32 are represented as darkened lines to illustrate that the heating elements 33 are visible to the thermal sensor 60. The heating elements 33 are very hot and are emitting IR energy at a much higher temperature than the "cold" stovetop of FIG. 4A. As a result, the heating elements 33 would appear very bright in the thermal image, which is represented by darker lines in FIG. 4B.

Figure 4C:
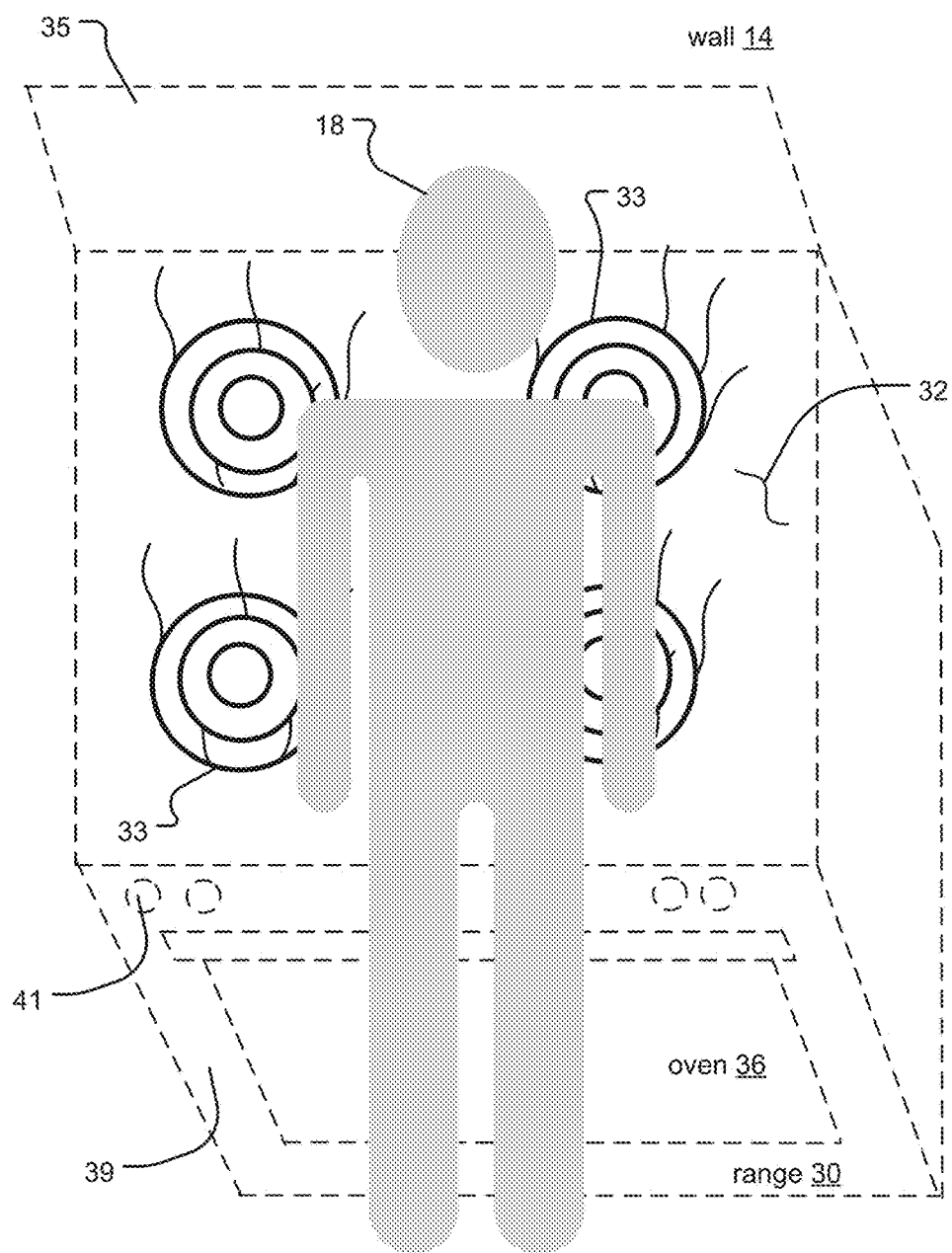
FIG. 4C is a diagram that represents a viewpoint of the thermal sensor for a hot cooktop as in FIG. 4B, and an individual is additionally attending to the cooktop.

FIG. 4C is a diagram that represents yet another viewpoint of the thermal sensor 60. The figure shows what the thermal sensor 60 of the cooking safety device 20A might "see"

when the cooking safety device 20A is properly installed and calibrated, the cooktop 32 is hot, and an individual 18 is attending to the cooktop 32.

Here, an individual 18 is standing in front of the heating elements 33. Because the individual 18 is blocking the hot heating elements 33, the thermal image captured by the thermal sensor 60 will be much less brighter than the thermal image of FIG. 4B. Also, the pixels of the thermal image obtained in FIG. 4C form larger "blobs" of pixels than in the thermal image captured for FIG. 4B, and the blobs will be less bright than the blobs of pixels for the image of FIG. 4B.

Figure 5A:
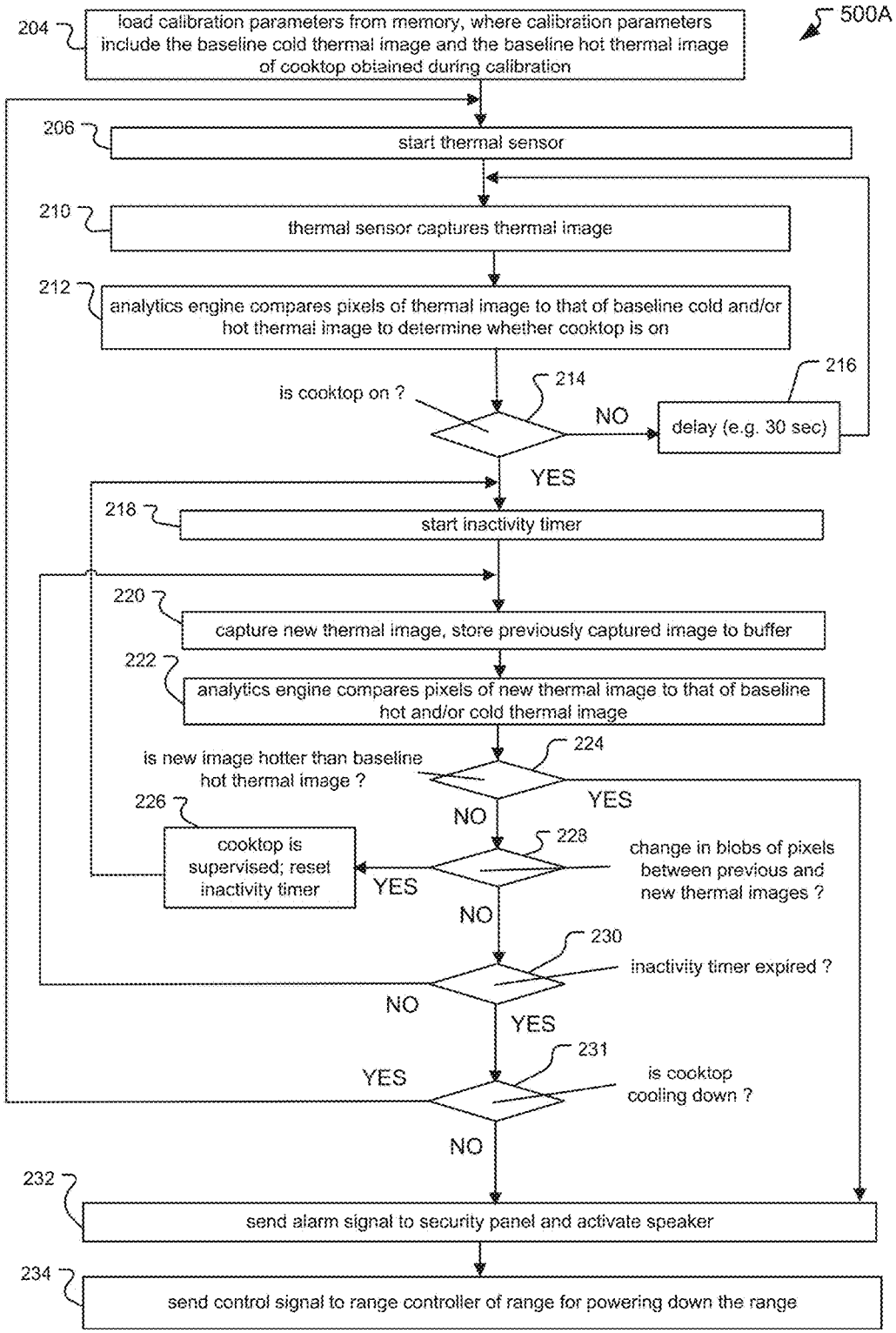
FIG. 5A is a flow chart that describes a method of operation for the wired cooking safety device of FIG. 2A.

FIG. 5A is a flow chart that describes a method of operation 500A for the wired cooking safety device 20A in FIG. 2A.

In step 204, controller 40 loads calibration parameters 27 from memory 24. The calibration parameters 27 include the baseline cold thermal image and the baseline hot thermal image of cooktop obtained during calibration. In step 206, the controller 40 starts the thermal sensor 60.

According to step 210, the thermal sensor 60 captures a thermal image of the cooktop 32. In step 212, the analytics engine 28, which is possibly a process executing on the controller 40, compares pixels of the thermal image to that of the baseline cold and/or hot thermal image to determine whether the cooktop 32 is on. In one example, if the captured image has brighter pixels located at the heating elements 33 of the cooktop 32 than in the baseline cold thermal image, the analytics engine 28 will determine that the cooktop 32 is on.

If the analytics engine 28 determines that the cooktop 32 is on, in step 214, the method transitions to step 218. Otherwise, the method transitions to step 216. In step 216, the controller 40 delays for a time period such as 30 seconds. The method them transitions back to the beginning of step 210 to capture another thermal image.

According to step 218, the controller 40 starts an inactivity timer. In one example, the inactivity timer is 10 minutes. In other examples, it is longer, such as 20 minutes, or longer. In other examples, it is shorter, such as 5 minutes or less. In step 220, the thermal sensor 60 then captures a new thermal image under control of the controller 40, and stores the previously captured thermal image to a buffer in memory 24. Then, in step 222, the analytics engine 28 compares pixels of the new thermal image to that of the baseline cold and/or hot thermal image.

In step 224, the analytics engine 28 determines whether the new thermal image is hotter than the baseline hot thermal image. Such a comparison is used to determine that an active or uncontrolled fire might be in progress at the cooktop 32. In another example, blobs of bright pixels that cover a substantially larger area in the new thermal image than in the baseline hot thermal image could also indicate a fire. If the comparison indicates a likely fire, the method transitions to step 232. Otherwise, the method transitions to step 228.

In step 228, the analytics engine 28 determines whether there is a change in blobs of pixels between the previous and new thermal images. If a change has occurred, such as when the blobs of the new thermal image cover a larger number of pixels in the new thermal image and are less bright than in the previous thermal image, the method transitions to step 226 to indicate that the cooktop 32 is attended/supervised. Also in step 226, the controller 40 resets the inactivity timer. Upon completion of step 226, the method transitions to the beginning of step 218 to restart the inactivity timer. Otherwise, the method transitions to step 230.

In step 230, the controller 40 checks whether the inactivity timer has expired. If the inactivity timer has expired, the method transitions to step 231. Otherwise, the method transitions to the beginning of step 220 to capture the next thermal image.

Then, in step 231, the controller 40 using the analytics engine 28 determines whether the cooktop 32 is cooling down, though unattended/unsupervised. For this purpose, the analytics engine 28 conducts a trends analysis of the thermal images captured over the period of the inactivity timer. If the overall trend of the cooktop 32 is cooling down, there is no need to sound the alarm. Here, to discriminate between whether the cooktop is slowly cooling and the blob detection, the analytics engine 28 can utilize the speed/rate of change of the pixels across the thermal images.

If the overall trend of the cooktop is cooling down, the method transitions back to the beginning of step 206 to (re)start the thermal sensor 60. Otherwise, the method transitions to step 232.

In step 232, the controller 40 sends an alarm signal 19 to the security panel 72 and the controller 40 activates the speaker 150 of the cooking safety device 20A. Then, in step 234, the controller 40 sends a control signal to the range controller 31 of the range 30 to power down the range 30, which also powers down the cooktop 32 of the range 30.

Figure 5B:
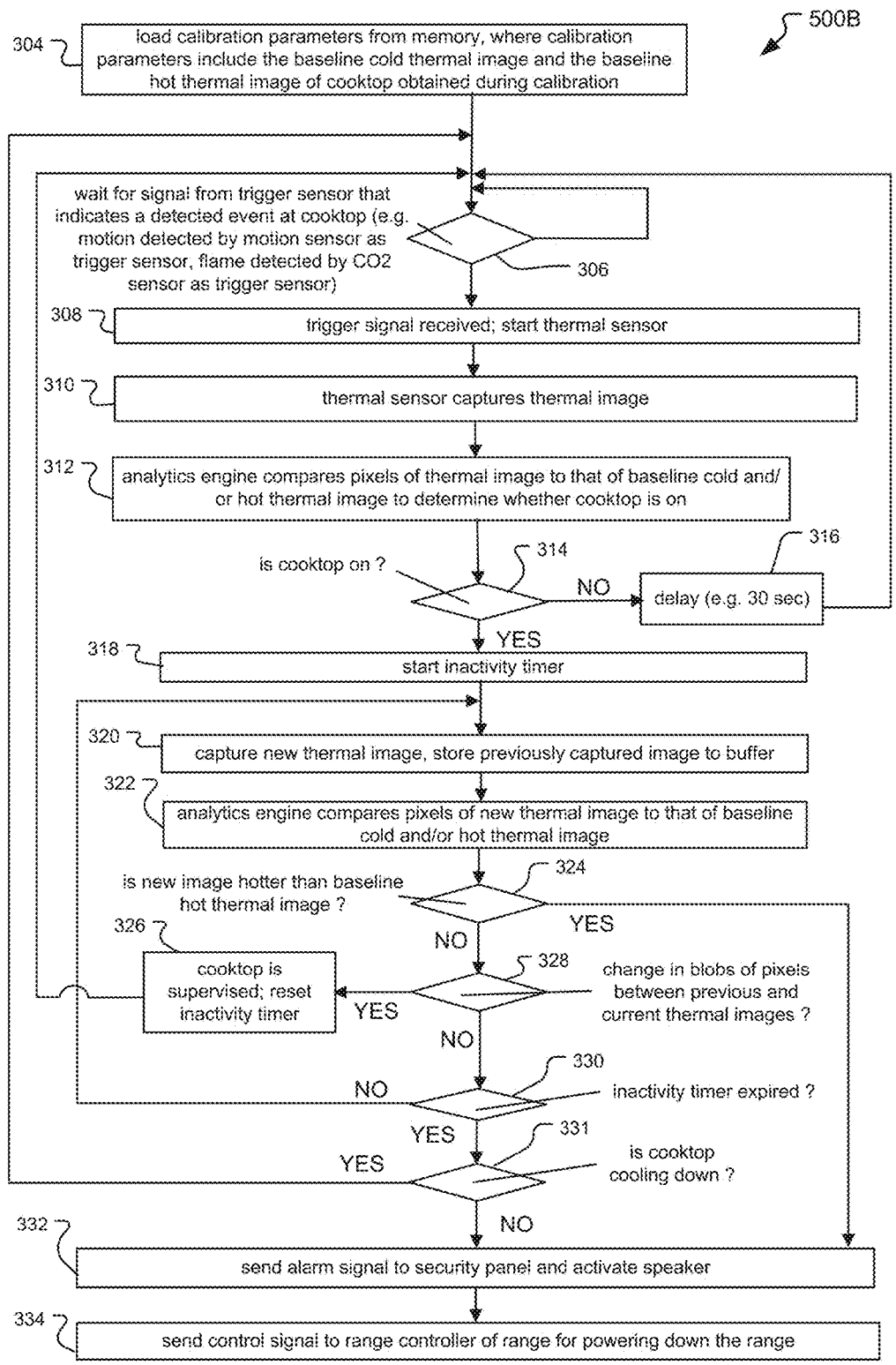
FIG. 5B is a flow chart that describes a method of operation for the wireless cooking safety device of FIG. 2B.

FIG. 5B is a flow chart that describes a method of operation 500B for the wireless cooking safety device 20B of FIG. 2B.

In step 304, controller 40 loads calibration parameters 27 from memory 24. The calibration parameters 27 include the baseline cold thermal image and the baseline hot thermal image of cooktop obtained during calibration.

In step 306, the controller 40 waits for signal from trigger sensor 68 that indicates a detected event at cooktop 32 (e.g. motion detected by motion sensor as trigger sensor, flame detected by $CO_2$ sensor as trigger sensor 68). According to step 308, when a trigger signal is received from the trigger sensor 68, the controller starts the thermal sensor.

According to step 310, the thermal sensor 60 captures a thermal image of the cooktop 32. In step 312, the analytics engine 28 compares pixels of the thermal image to that of the baseline cold and/or hot thermal image to determine whether the cooktop 32 is on.

If the analytics engine 28 determines that the cooktop 32 is on, in step 314, the method transitions to step 318. Otherwise, the method transitions to step 316. In step 316, the controller 40 delays for a time period such as 30 seconds. The method them transitions back to the beginning of step 306 to await the next trigger signal sent from the trigger sensor 68.

According to step 318, the controller 40 starts an inactivity timer having a value of 10 minutes, in one example. In step 320, the thermal sensor 60 then captures a new thermal image, and stores the previously captured thermal image to a buffer in memory 24. Then, in step 322, the analytics engine 28 compares pixels of the new thermal image to that of the baseline cold and/or hot thermal image.

In step 324, the analytics engine 28 determines whether the new thermal image is hotter than the baseline hot thermal image. If the comparison indicates that the new thermal image is hotter, the method transitions to step 332. Otherwise, the method transitions to step 328.

In step 328, the analytics engine 28 determines whether there is a change in blobs of pixels between the previous and new thermal images. If a change has occurred, the method transitions to step 326 to indicate that the cooktop 32 is attended/supervised. Also in step 326, the controller 40 resets the inactivity timer. Upon completion of step 326, the method transitions to the beginning of step 306 to await a new trigger signal from the trigger sensor 68. Otherwise, the method transitions to step 330.

In step 330, the controller 40 checks whether the inactivity timer has expired. If the inactivity timer has expired, the method transitions to step 331. Otherwise, the method transitions to the beginning of step 320 to capture the next thermal image.

Then, in step 331, the analytics engine 28 determines whether the cooktop 32 is cooling down, though unattended/unsupervised, as in step 231 of FIG. 5A.

If the overall trend of the cooktop is cooling down, the method transitions back to the beginning of step 306 to await a new trigger signal from the trigger sensor 68. Otherwise, the method transitions to step 332.

In step 332, the controller 40 sends an alarm signal 19 to the security panel 72 and the controller 40 actives the speaker 150 of the cooking safety device 20B. Then, in step 334, the controller 40 sends a control signal to the range controller 31 of the range 30 to power down the range 30, which also powers down the cooktop 32 of the range 30.

According to further innovations, the device may further contain one or more humidity sensors (to monitor the cooking process), volatile organic compounds (VOCs) sensors and/or particle sensors (to detect what type of food is supposed to be cooked), data that can feed the analytics engine to decrease the risk of false alarms; because it's a self-contained device, it can have its own audio indicator like a smoke alarm that sounds when left unattended for a period of time or/and when connectivity is lost.

In an embodiment, the device 20 may learn cooking behavior (the time can be synchronized over the internet) and check if there are abnormalities related to cooking pattern. A correlation with the security system 100 can be performed and a flag/alert raised if the stove is active and the alarm gets armed.

While this invention has been particularly shown and described with references to preferred embodiments thereof, it will be understood by those skilled in the art that various changes in form and details may be made therein without departing from the scope of the invention encompassed by the appended claims.

What is claimed is:

1. A cooking safety device, comprising:
    a thermal sensor that detects infrared radiation (IR) to generate thermal images of a cooktop over time; and
    a controller that uses the thermal images over the time to determine whether IR energy emitted by the cooktop is blocked or not blocked by an individual in the thermal images over the time, and in response to determine whether the cooktop is unattended.

2. The device of claim 1, further comprising an analytics engine that analyzes the thermal images captured by the thermal sensor to determine whether one or more heating elements of the cooktop are on.

3. The device of claim 1, further comprising an analytics engine that analyzes the thermal images captured by the thermal sensor to determine whether an uncontrolled fire exists.

4. The device of claim 1, wherein the thermal sensor is a spatially resolved detector having pixels arranged in an array.

5. The device of claim 1, further comprising a trigger sensor that detects heat, flames, or motion at the cooktop, and sends a signal to turn on the thermal sensor in response to the detection.

6. The device of claim 1, further comprising a sighting laser for positioning a field of view of the thermal sensor.

7. The device of claim 1, wherein the device sends an alarm signal to a panel in response to determining that one or more heating elements of the cooktop are on and that the cooktop is unattended for a predetermined time period.

8. The device of claim 1, further comprising an analytics engine that determines whether one or more heating elements of the cooktop are on by comparing a new thermal image of the cooktop against a baseline cold thermal image of the cooktop, or by comparing the new thermal image to a baseline hot thermal image of the cooktop, or both.

9. The device of claim 1, wherein a field of view of the thermal sensor is positioned such that individuals located near a front of the cooktop mask one or more heating elements of the cooktop from the field of view of the thermal sensor.

10. The device of claim 1, wherein the controller is configured to determine whether the IR energy emitted by the cooktop is blocked or not blocked by the individual in the thermal images based on a temperature transition over the time between the thermal images over the time.

11. The device of claim 1, further comprising determining whether the IR energy emitted by the cooktop is blocked or not blocked by the individual in the thermal images based on a temperature transition over the time between the thermal images over the time.

12. A method for monitoring a cooktop, comprising:
    detecting infrared radiation (IR) to generate thermal images of the cooktop over time; and
    using the thermal images over the time to determine whether IR energy emitted by the cooktop is blocked or not blocked by an individual in the thermal images over the time, and in response to determine whether the cooktop is unattended.

13. The method of claim 12, further comprising analyzing the thermal images to determine whether one or more heating elements of the cooktop are on.

14. The method of claim 12, further comprising analyzing the thermal images to determine whether an uncontrolled fire exists.

15. The method of claim 12, wherein the thermal images are captured by a thermal sensor, which is a spatially resolved detector having pixels arranged in an array.

16. The method of claim 12, further comprising detecting heat, flames, or motion at the cooktop, and in response capturing the thermal images.

17. The method of claim 12, further comprising sending an alarm signal to a panel in response to determining that one or more heating elements of the cooktop are on and that the cooktop is unattended for a predetermined time period.

18. The method of claim 12, further comprising determining whether one or more heating elements of the cooktop are on by comparing a new thermal image of the cooktop against a baseline cold thermal image of the cooktop, or by comparing the new thermal image to a baseline hot thermal image of the cooktop, or both.

19. The method of claim 12, wherein the detecting of the IR to generate the thermal images comprises detecting by a thermal sensor having a field of view positioned such that individuals located near a front of the cooktop mask one or more heating elements of the cooktop from the field of view of the thermal sensor.

20. A cooking safety device, comprising:
    a thermal sensor that detects infrared radiation (IR) to generate thermal images of a cooktop over time, the thermal sensor having a field of view with respect to the cooktop such that an individual near a front of the cooktop blocks one or more heating elements of the cooktop from the field of view of the thermal sensor; and a trigger sensor that detects heat, flames, or motion at the cooktop, and sends a signal to turn on the thermal sensor in response to the detection.

21. A cooking safety device, comprising:

a thermal sensor that detects infrared radiation (IR) to generate thermal images of a cooktop over time, the thermal sensor having a field of view with respect to the cooktop such that an individual near a front of the cooktop blocks one or more heating elements of the cooktop from the field of view of the thermal sensor; and a sighting system for positioning the field of view of the thermal sensor with respect to the cooktop.

* * * * *